US008840021B2

(12) United States Patent
Wieser

(10) Patent No.: US 8,840,021 B2
(45) Date of Patent: Sep. 23, 2014

(54) PRESENCE CHECK OF OBJECTS

(75) Inventor: Stefan Wieser, Gerasdorf (AT)

(73) Assignee: NXP, B.V., Eindhoven (NL)

( * ) Notice: Subject to any disclaimer, the term of this patent is extended or adjusted under 35 U.S.C. 154(b) by 2122 days.

(21) Appl. No.: 11/575,486

(22) PCT Filed: Sep. 14, 2005

(86) PCT No.: PCT/IB2005/053008

§ 371 (c)(1),
(2), (4) Date: Mar. 16, 2007

(87) PCT Pub. No.: WO2006/030387

PCT Pub. Date: Mar. 23, 2006

(65) Prior Publication Data

US 2008/0203158 A1 Aug. 28, 2008

(30) Foreign Application Priority Data

Sep. 17, 2004 (EP) .................................... 04104517

(51) Int. Cl.
*G06K 19/00* (2006.01)
*G08B 13/14* (2006.01)
*G08B 21/24* (2006.01)

(52) U.S. Cl.
CPC ............ *G08B 13/1427* (2013.01); *G08B 21/24* (2013.01)
USPC ............................ 235/385; 235/487; 235/492

(58) Field of Classification Search
None
See application file for complete search history.

(56) References Cited

U.S. PATENT DOCUMENTS

| | | | | |
|---|---|---|---|---|
| 5,164,707 | A | 11/1992 | Rasmussen et al. | |
| 5,798,693 | A * | 8/1998 | Engellenner | 340/10.33 |
| 5,844,482 | A * | 12/1998 | Guthrie et al. | 340/572.4 |
| 6,232,877 | B1 | 5/2001 | Ashwin | |
| 6,401,378 | B1 | 6/2002 | Ockenfuss | |
| 6,462,660 | B1 | 10/2002 | Cannon | |
| 6,501,378 | B1 | 12/2002 | Knaven | |
| 7,015,811 | B2 * | 3/2006 | Decker et al. | 340/539.22 |
| 7,161,487 | B1 * | 1/2007 | Tracey et al. | 340/572.1 |
| 2002/0158751 | A1 | 10/2002 | Bormaster | |
| 2003/0008659 | A1 * | 1/2003 | Waters et al. | 455/456 |
| 2003/0137418 | A1 | 7/2003 | Lee et al. | |
| 2006/0001542 | A1 * | 1/2006 | Waris | 340/572.1 |

FOREIGN PATENT DOCUMENTS

| | | | |
|---|---|---|---|
| JP | 2004-013789 | A | 1/2004 |
| JP | 2004-258908 | A | 9/2004 |

* cited by examiner

*Primary Examiner* — Matthew Mikels

(57) ABSTRACT

The data carriers (T I, T2, T3, T4) of those objects (1, 2, 3, 4) whose presence is to be checked, are allocated to a check group (ÜG), in a method of checking the presence of objects characterized by noncontact readable data carriers, wherein each noncontact readable data carrier can be identified uniquely or in groups. Data carriers (T1 to T6) are detected by data carrier reading means (5) and it is detected whether at least one of the detected data carriers (T1 to T6) is allocated to an activation group (AG). If at least one of the detected data carriers (T4, T5) is allocated to the activation group (AG), the presence check is activated, while it is checked during the presence check whether all the data carriers (T1 to T4) allocated to the check group (ÜG) are detected by the data carrier reading means (5) and, if not, an alarm signal (AL) is transmitted.

10 Claims, 1 Drawing Sheet

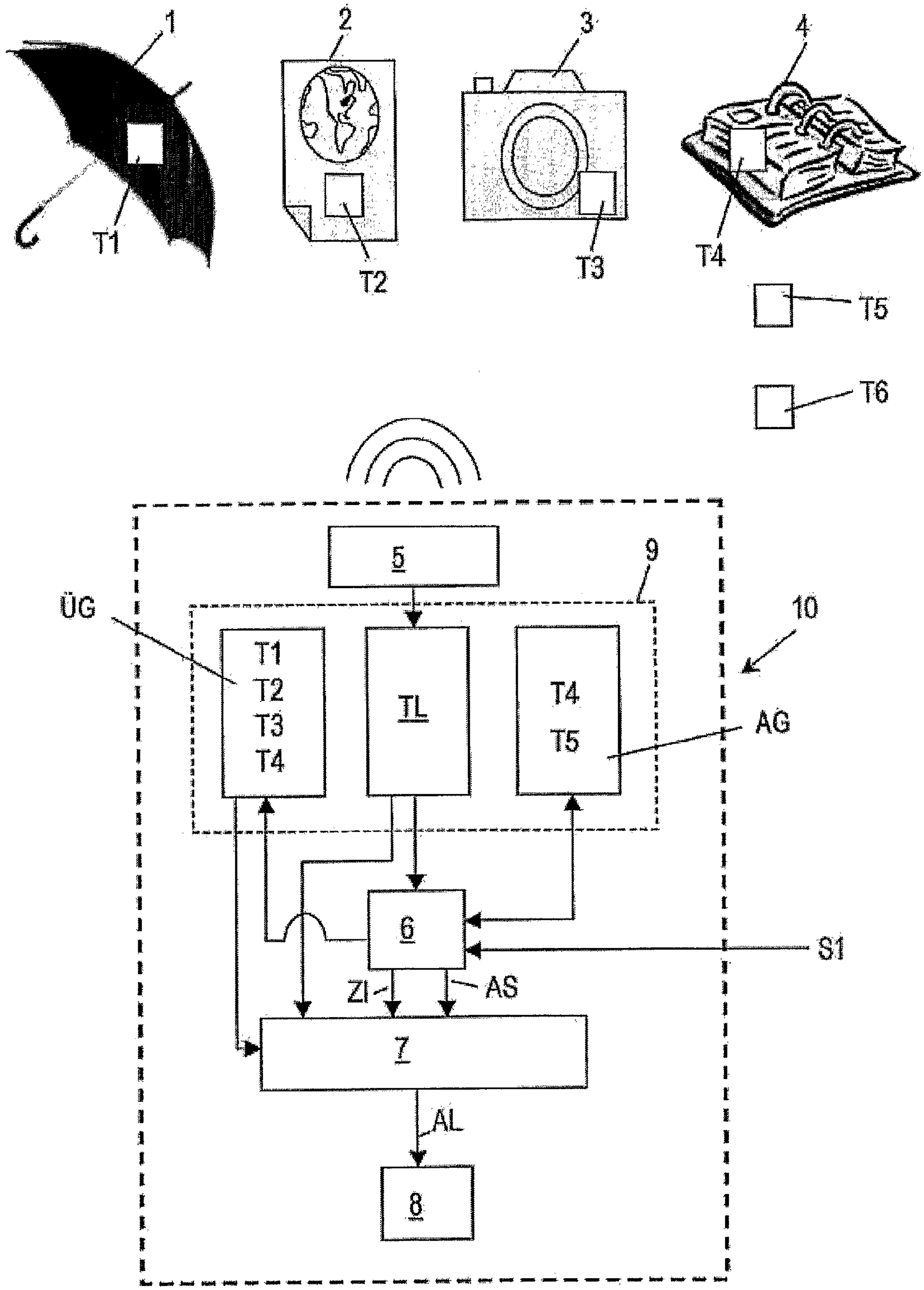
1
2
3
4
T1
T2
T3
T4
T5
T6
5
9
ÜG
10
T1
T2
T3
T4
TL
T4
T5
AG
6
S1
ZI
AS
7
AL
8

PRESENCE CHECK OF OBJECTS

FIELD OF THE INVENTION

The invention relates to a method of checking the presence of objects, which are characterized by noncontact readable data carriers, wherein each noncontact readable data carrier can be identified unambiguously or in groups, wherein the data carriers of those objects whose presence is to be checked are allocated to one check group.

The invention further relates to a device for checking the presence of objects, which are characterized by noncontact readable data carriers, wherein each noncontact readable data carrier can be identified unambiguously or in groups, wherein the data carriers of those objects whose presence is to be checked are allocated to one check group.

The invention further relates to a system for checking the presence of objects, which are characterized by noncontact readable data carriers.

BACKGROUND OF THE INVENTION

A reminding system and method used for reminding a user of missing portable electronic devices are known from document U.S. Pat. No. 6,462,660. For this purpose, the reminding system transmits a signal to every portable electronic device that is to be detected by the reminding system upon occurrence of an activation event. If one or more of the addressed portable electronic devices do not respond to this signal, the reminding system alarms the user of the missing devices.

It has proved to be a disadvantage in the known reminding system and method that the generation of the activation event is not achieved satisfactorily. It is therefore proposed in this document to consider the leaving on of an automobile, the opening or closing of a door or the expiry of a preset period to be an activation event. All these proposed events, however, demand constructive measures such as the installation of switches on devices that have nothing to do with the reminding system per se or that either an interaction of the user for setting the time is required on the expiry of a preset period, or it is possible that a fixed preset expiry period is not suitable for the individual case.

OBJECT AND SUMMARY OF THE INVENTION

It is an object of the invention to create a presence checking method of the type indicated in the opening paragraph, a presence checking device of the type indicated in the second paragraph and a presence checking system of the type indicated in the third paragraph, in which the disadvantages mentioned earlier are avoided.

To achieve the above-mentioned object, a presence checking method as invented has features such that a method as invented can be characterized in the manner mentioned below, namely:

A method of checking the presence of objects, which are characterized by noncontact readable data carriers, wherein each noncontact readable data carrier can be identified unambiguously or in groups, wherein the data carriers of those objects whose presence is to be checked are allocated to one check group, the method comprising the detection of data carriers by data carrier reading means, the detection whether at least one of the detected data carriers is allocated to an activation group and the activation of the presence check, if at least one of the detected data carriers is allocated to the activation group, wherein it is checked at the time of the presence check whether all the data carriers allocated to the check group are detected by the data carrier reading means and, if not, an alarm signal is transmitted.

To achieve the above-mentioned object, features as invented are provided on a presence check device as invented, such that a device as invented can be characterized in the manner mentioned below, namely:

A device for checking the presence of objects, which are characterized by noncontact readable data carriers, wherein each noncontact readable data carrier can be identified unambiguously or in groups, wherein the data carriers of those objects whose presence is to be checked are allocated to one check group, the device comprising data carrier reading means for detection of data carriers, detection means for detecting whether at least one of the data carriers detected by the data carrier reading means is allocated to an activation group and for activation check means if at least one of the detected data carriers is allocated to the activation group, wherein the check means are arranged for comparing whether all the data carriers allocated to the check group are detected by the data carrier reading means and, if they are not, for transmitting an alarm signal.

To achieve the above-mentioned object in such a system for checking the presence of objects characterized by noncontact readable data carriers, a device as invented for checking the presence, as well as a plurality of noncontact readable data carriers are provided, wherein a first set of the data carriers is allocated to a check group and a second set of data carriers is allocated to an activation group and optionally also to the check group.

It is achieved by means of the features as invented that the checking of presence of certain objects is linked to the presence of certain conditions such that it is possible to prevent undesired alarms from being generated as often happens if the presence check is carried out constantly. Unlike state of the art systems, which assess activation events, it is not necessary according to the invention to provide measures unrelated to the check system on devices such as installation of switches on automobiles, doors, bags or such. Such additional measures are not accepted by users and therefore hamper dissemination of these known systems. The invention can moreover be integrated very well into portable electronic devices such as mobile telephones or PDAs, which often already contain all assemblies required for the realization of the invention, such that the invention can be integrated into such devices without additional expenditure. For example, there are already mobile telephones and PDAs, in which reading devices for noncontact data carriers are available. It is therefore proposed to deliver, together with such devices, a number of data carriers, which can be glued to objects whose presence is to be checked i.e. and which are allocated to a check group or whose presence is to give cause to check the presence of other objects i.e. which are allocated to an activation group. The serial numbers of the data carriers supplied along can already be pre-stored under their allocation to the check group and/or to the presence group in the delivered device, such that the expenditure for the user is reduced to sticking the data carrier to the desired objects.

The advantage derived according to the measures as claimed in Claims 2 and 6 is that the creation of the check group and the activation group takes place in a manner that is extremely simple and comfortable to the user, in which operating errors are largely eliminated.

The advantage derived according to the measures as claimed in Claims 3 and 7 is that the presence check is executed only in a defined, short period or that there is a one-time check run, thus preventing undesired alarm signals that would be triggered, for example, if a user were to bring one of these objects intentionally out of range of the data carrier reading means, after establishing by means of the invention that all the desired objects are present.

The advantage derived according to the measures as claimed in Claims 4 and 8 is that a condition is formulated on the basis of the detected direction of movement, whether the presence check is to be carried out or not. The term "direction of movement" is to be understood to mean that even the approach or retreat is regarded as direction information. For example, a user would like to check on leaving his residence or his office whether he is carrying all the objects defined in the check group. Conversely, he may not be interested in a check on entering the residence or the office, because he is intentionally not carrying objects that are defined in the check group but are not available (or it is too late to collect them).

The advantage derived according to the measures as claimed in claim 9 is that the invention can be integrated into existing electronic devices without additional expense. Mobile telephones and PDAs thus already have Near Field Communication (NFC) reading devices for noncontact reading-in data carriers that can be used for the invention. Similarly, these devices have input means (keys etc.) and output means such as indicator tone generator, displays and vibrators, through which the operation by a user and the output of alarms can be realized.

These and further aspects of the invention are apparent from and will be elucidated with reference to the example of embodiment described hereinafter.

BRIEF DESCRIPTION OF THE DRAWINGS

The invention will be described in the following with reference to one example of embodiment represented in the single FIGURE, to which embodiment the invention is not restricted, however.

DESCRIPTION OF EMBODIMENTS

The single FIGURE (FIG. 1) shows a block circuit diagram of a system according to the invention for checking the presence of objects characterized by noncontact readable data carriers. By way of example, four objects are shown, viz. an umbrella 1, a ticket 2, a camera 3 and a notepad 4. Each of these four objects is provided with a noncontact readable data carrier T1, T2, T3, T4. Two other data carriers T5, T6 are not allocated to any object. A requirement for these data carriers T1 to T6 is that they are unambiguously identifiable (e.g. through a serial number) or at least identifiable in groups (through a group number). The data carriers T1 to T6 are arranged as RFID tags in this example of embodiment. It may be observed that the data carriers T1 to T6 have identical design. The advantage that this offers is that the functions allocated according to the invention to the respective data carriers T1 to T6 can be interchanged at any time.

The system for checking the presence of objects, as invented, further comprises a device 10 for checking the presence of objects characterized by noncontact readable data carriers. This presence check device 10 comprises data carrier reading means 5, which are arranged to detect the data carriers T1 to T6, if they are within range of the data carrier reading means 5. The data carrier reading means 5 can, for example, be arranged as a Near Field Communication (NFC) Device. The data carrier reading means define the identity of the codes identifying the data carriers detected by them (e.g. serial numbers) in a data carrier table TL. This table TL is updated with every reading-in routine. Moreover, a check group ÜG is stored in the presence check device 10, which group contains all those data carriers whose presence is to be checked. In the example of embodiment shown these are the data carriers T1 to T4, i.e. a check is to be made whether the objects 1 to 4 are present. Moreover, an activation group AG is stored in the presence check device 10. This group presently contains the data carriers T4 and T5. According to the invention, detection means 6 are present in the presence check device 10, the function of which detection means being to check whether at least one of the data carriers currently entered in the data carrier table TL is a member of the activation group AG. If so, the detection means 6 activate the check means 7 arranged in the presence check device 10. These check means 7 carry out the actual presence check by comparing whether all data carriers T1 to T4 contained in the check group ÜG are also entered in the data carrier table TL; in other words, whether the data carrier reading means 5 can currently detect all the data carriers T1 to T4 contained in the check group. If they could not detect them, then the check means 7 transmit an alarm signal AL to the alarm means 8, to inform the user that one or more of the objects that should actually be present are missing, whereupon the alarm signal AL can obtain the exact information as to which of the objects are missing. Depending on the configuration of the alarm means 8 as acoustic, visual or tactile alarm means, the information to the user can be designed to be a simple buzz tone up to clear text display about the missing objects. It should be observed that the data carrier table TL, the check group ÜG and the activation group AG can be stored in different areas of the same physical memory 9. Of course, storage in different memories is also possible.

In the present example of embodiment, when the presence is checked of the data carriers T4 or T5, the presence would also be checked of the data carriers T1 to T4, or the presence of the objects associated with them, umbrella 1, ticket 2, camera 3 and notepad 4, as the case may be, is checked at the time of detection. One recognizes from this that the notepad 4 or the data carrier T4 attached to it, respectively, is a member of the check group ÜG as well as the activation group AG. In this respect this is suitable if also the checking of the presence of the data carriers T1 to T4 is activated when the data carrier T5 is detected. The data carrier T5 is a that time not allocated to any object, but it could be placed, for example, in the passenger compartment of a automobile, such that each time a user carrying the presence check device 10 on him gets into the automobile, the checking is activated whether the objects 1 to 4 are also in the automobile. It may further be observed that, though only one check group ÜG is shown in the present example of embodiment, there may be various check groups which are associated with different activation groups. For example, an activation group could be defined, which contains only the data carrier T4 and a check group containing only the data carriers T2 and T3 could be allocated to this activation group, such that each time the notepad 4 arrives within the detection range of the data carrier reading means 5, the detection means 6 detect that the associated data carrier T4 is present and in which activation group the associated data carrier is present and, with the help of the detected activation group, select a check group and pass the information ZI about the selected check group on to the check means 7 in addition to the activation signal AS. It may further be observed that due to the similar construction of the data carriers T1 to T6 the functions of the data carriers can be interchanged any time i.e. one or more of the data carriers T1 to T3 from the check group ÜG can be deleted and added to the activation group AG in turn. In a similar manner, the data carrier T5 could be shifted from the activation group AG to the check group ÜG.

As can be seen, the data carrier T6 is then allocated neither to the check group ÜG nor to the activation group AG. With the help of this data carrier T6 it will now be explained how the inclusion in one of the groups takes place in preferred manner. Let it be assumed that the data carrier T6 is to be included in the activation group AG, e.g. so that it can thus be fixed in another automobile and is used there for activating the checking. For this purpose, the data carrier T6 is placed selectively in the detection range of the data carrier reading means 5 and the detection means 6 are switched into a mode, by means of a signal S1 that is triggered by the user, for example, by pressing a key, in which mode they add all the data carriers contained in the data carrier table TL (at that time there is only the data carrier T6 in it) to the activation group AG (possible on prior deletion of all existing entries to the activation group AG). The detection means can also be switched into a mode by the signal S1 in which they add all the data carriers contained in the data carrier table TL to the check group ÜG.

To preclude undesired alarms, a further provision can be made that the activation signal AS activates the check means 7 only for a short predefined period or for a one-time check run, in which run a comparison is made only once for each of the entries contained in the check group ÜG, whether at that time there is a corresponding entry in the data carrier table TL.

In another embodiment of the invention, the detection means 6 are arranged to detect a direction of movement of the data carriers and to active the check means 7 only if the detected direction of movement lies within a predetermined range. In the simplest case, this can be realized in such a manner that the detection means 6 cyclically check the data carrier table TL to detect if a data carrier has been newly entered into or removed from the data carrier table TL. This makes it possible to recognize approach or retreat of this data carrier to or from the detection range of the data carrier reading means 5. In a more expensive embodiment the detection means 6 can assess information through the signal strength produced by the data carriers or a plurality of data carrier reading means 5 can be provided whose results are assessed. In yet another embodiment, the detection of a direction of movement is effected by detection of two data carriers at different times. For example, the data carrier T5 may be attached to a door of a residence and the data carrier T6 (with prior allocation to the activation group AG) may be arranged further inside the residence. The detection means 6 in this embodiment are arranged such that after each detection of the two data carriers T5, T6 they can recognize whether a user is entering or leaving the residence. The sequence T5→T6 means entering the residence, whereas the sequence T6→T5 means leaving the residence. Depending on the sequence, various data carriers T1 to T4 contained in the check group ÜG can be queried i.e. various query profiles can be defined. Similarly, the alarm signal AL could be triggered only when leaving the residence, if objects are missing, because only in such a case can the objects be taken away.

The presence check device 10 as invented can be integrated eminently into portable electronic devices, such as a mobile phone or a Personal Digital Assistant (PDA). Already now, such devices have Near Field Communication (NFC) reading devices for noncontact reading-in of data carriers that can be used for the invention. Similarly, these devices have input means (keys etc.) and output means such as indicator tone generators, displays and vibrating means, through which the operation by a user and the output of alarms can be realized.

The invention claimed is:

1. A method of checking the presence of objects, which are characterized by noncontact readable data carriers, wherein each noncontact readable data carrier can be identified unambiguously or in groups, wherein the data carriers of objects to be checked for presence are allocated to one check group, the method comprising the detection of data carriers by data carrier reading means the detection whether at least one of the detected data carriers is allocated to an activation group and the activation of the presence check, if at least one of the detected data carriers is allocated to the activation group wherein it is checked at the time of the presence check whether all the data carriers allocated to the check group are detected by the data carrier reading means and, if not, an alarm signal is transmitted.

2. A method as claimed in claim 1, in which the allocation of data carriers to the check group and/or the activation group comprises the selective placement of the data carriers within the range of the data carrier reading means the detection of the data carriers by the data carrier reading means and the storing of the detected data carriers in the check group or in the activation group respectively.

3. A method as claimed in claim 1, in which, on detection of a data carrier allocated to the activation group the presence check is activated for a predefined period or for a one-time check run.

4. A method as claimed in claim 1, in which the detection of data carriers allocated to the activation group comprises the detection of a direction of movement of these data carriers or recognition in a time-shifted manner of these data carriers, the presence check being activated only if the detected direction of movement lies within a predetermined range or if the data carriers are recognized in a certain time sequence.

5. A device for checking the presence of objects, which are characterized by noncontact readable data carriers, wherein each noncontact readable data carrier can be identified unambiguously or in groups, wherein the data carriers of objects to be checked for presence are allocated to one check group the device comprising data carrier reading means for detection of data carriers detection means for detecting whether at least one of the data carriers detected by the data carrier reading means is allocated to an activation group and for activation check means if at least one of the detected data carriers is allocated to the activation group wherein the check means are arranged for comparing whether all the data carriers allocated to the check group are detected by the data carrier reading means and, if they are not, for transmitting an alarm signal.

6. A device as claimed in claim 5, in which data carriers can be allocated to the check group and/or to the activation group by selectively placing the data carriers within the range of the data carrier reading means and the detection means are arranged to store the data carriers detected by the data carrier reading means in the check group or in the activation group respectively.

7. A device as claimed in claim 5, in which the check means can be activated for a specified period or for a one-time check run.

8. A device as claimed in claim 5, in which the detection means for detecting data carriers allocated to the activation group are arranged to detect a direction of movement of these data carriers or to detect them in a time-shifted sequence, and activate the check means not until the detected direction of movement falls within a predetermined range or a certain time sequence of the detection has been given.

9. A device as claimed in claim 5, in which the device is integrated into a portable electronic device such as a mobile telephone or a Personal Digital Assistant.

10. A system for checking the presence of objects, which are characterized by noncontact readable data carriers the system comprising a device for checking the presence as claimed in claim 5 as well as a plurality of noncontact readable data carriers wherein a first set of the data carriers is allocated to a check group and a second set of data carriers is allocated to an activation group and optionally also to the check group.

* * * * *